(12) United States Patent  (10) Patent No.: US 7,639,411 B2
Mukai  (45) Date of Patent: Dec. 29, 2009

(54) LASER SCANNING UNIT AND IMAGE FORMING APPARATUS HAVING THE SAME

(75) Inventor: Toshiro Mukai, Utsunomiya (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 11/848,503

(22) Filed: Aug. 31, 2007

(65) Prior Publication Data

US 2008/0055687 A1    Mar. 6, 2008

(30) Foreign Application Priority Data

Sep. 4, 2006    (JP)    ............................... 2006-238770

(51) Int. Cl.
*G02B 26/08* (2006.01)
(52) U.S. Cl. .................................................. 359/205.1
(58) Field of Classification Search ......... 359/212–215, 359/205.1, 206.1, 207.1, 207.2, 207.8, 212.1
See application file for complete search history.

(56) References Cited

U.S. PATENT DOCUMENTS

2003/0234856 A1* 12/2003 Jin .............................. 347/238

FOREIGN PATENT DOCUMENTS

JP         3-245115         10/1991

OTHER PUBLICATIONS

English language Abstract of JP 3-245115.

* cited by examiner

*Primary Examiner*—Euncha P Cherry
(74) *Attorney, Agent, or Firm*—Greenblum & Bernstein, P.L.C.

(57) ABSTRACT

A light source provided with a laser element that emits a laser beam emits a laser beam for synchronization control. A synchronization mirror reflects the laser beam so as to allow a light receiving element in the light source to detect the laser beam. The synchronization mirror is provided on f-θ lenses opposite to a light deflector, such that the f-θ lenses are provided neither on a light beam path that connects the light source and the light deflector nor on a light beam path for synchronization control that connects the light deflector and the synchronization mirror.

16 Claims, 10 Drawing Sheets

LASER SCANNING UNIT AND IMAGE FORMING APPARATUS HAVING THE SAME

BACKGROUND OF THE INVENTION

1. Field of the Invention

The present invention relates to a laser scanning unit and an image forming apparatus having the same.

2. Description of Related Art

An image forming apparatus that forms an image on a recording paper in an electrophotographic process (printer, facsimile apparatus, copier, multifunction apparatus, and the like) is provided with a laser scanning unit, in which a light deflector deflects a light beam emitted from a light source so as to scan a photoconductor for forming a latent image thereon. In order to maintain at a constant level, the light intensity of the light source, which fluctuates according to environmental change, such as a temperature change and the like, the laser scanning unit performs light intensity control, in which the unit detects an actual light intensity of the light source so as to control a driving current of the light source. Further, in order to properly expose a predetermined image forming area on the photoconductor, the laser scanning unit performs synchronization control, in which the unit detects a returning beam so as to control a scan timing, the returning beam being the light beam emitted from the light source and then reflected and returned by a mirror.

Such a laser scanning unit is generally provided with separate light detecting sensors: a sensor for detecting the light intensity of the light source for light intensity control; and a sensor for detecting the light beam for synchronization control. In order to reduce cost by reducing the number of parts, however, technology is known in which a light detecting sensor provided proximate to a light source is used for detecting both the light intensity of the light source and a light beam for synchronized control; a mirror reflects and returns, to an emitting position, the light beam for synchronization control emitted from the light source; and thereby the light detecting sensor provided proximate to the light source performs detection (Refer to Related Art 1).

[Related Art 1] Japanese Patent Laid-open Publication H3-245115 (FIGS. 1 and 3)

Misalignment of a light beam path due to optical axis misalignment stemming from a forming error is inevitable in an f-θ lens, which is provided to allow the light beam to form an image on the photoconductor. In the aforementioned conventional art, when the synchronization mirror reflects and returns, to the emitting position, the light beam for synchronization control emitted from the light source, the light beam passes through the f-θ lens twice in total: on an outgoing path from the light source to the synchronization mirror, and on a returning path from the synchronization mirror to the emitting position. The f-θ lens thus has a huge impact to the light beam for synchronization control. When the light beam returning to the emitting position largely deviates from a proper position, a problem occurs where the detection accuracy of the light beam declines.

Further, misalignment of the light beam path due to commonly-called axis inclination is inevitable in a light deflector having a rotating polygon mirror. The axis inclination is a phenomenon where a rotating axis deviates from a proper position during rotation. In the aforementioned conventional art, when the synchronization mirror reflects and returns, to the emitting position, the light beam for synchronization control emitted from the light source, the light beam is reflected by the light deflector twice in total: on the outgoing path from the light source to the synchronization mirror, and on the returning path from the synchronization mirror to the emitting position. The light deflector thus has a huge impact to the light beam for synchronization control. When the light beam returning to the emitting position largely deviates from a proper position, a problem occurs where the detection accuracy of the light beam declines.

SUMMARY OF THE INVENTION

The present invention is provided to address the above-described problems in the conventional arts. A main object of the present invention is to provide a laser scanning unit and an image forming apparatus having the same, which are capable of preventing an impact from an imaging optics member to a light for synchronization control, and thus improving the detection accuracy of the light for synchronization control. Further, another object of the present invention is to provide a laser scanning unit and an image forming apparatus having the same, which are capable of reducing an impact from a light deflector to a light for synchronization control, and thus improving the detection accuracy of the light for synchronization control.

A laser scanning unit according to the present invention has a light source that emits a light; a light deflector that deflects the light from the light source and scans a scanned body with the light; an imaging optics member that allows the light deflected by the light deflector to form an image on the scanned body; a light detecting sensor that detects light intensity of the light source, and detects a light for synchronization control; and a synchronization mirror that reflects the light from the light source for synchronization control and directs the light to the light detecting sensor. The synchronization mirror is provided with respect to the imaging optics member opposite to the light deflector, the imaging optics member is provided outside of a light path of light from the light source to the light deflector and outside of the light path of light from the light deflector to the synchronization mirror.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

A first aspect of the present invention provides a laser scanning unit having a light source that emits a light beam; a light deflector that deflects the light beam from the light source and scans a scanned body, such as photo conductive drum, with the light beam; an imaging optics member, such as f-θ lens, that allows the light beam deflected by the light deflector to form an image on the scanned body; a light detecting sensor that is provided proximate to the light source, detects light intensity of the light source, and detects a light beam for synchronization control; and a synchronization mirror that reflects the light beam from the light source for synchronization control and directs the light beam to the light detecting sensor. The synchronization mirror is provided to the imaging optics member opposite to the light deflector, such that the imaging optics member is provided neither on a light beam path from the light source to the light deflector nor on a light beam path for synchronization control from the light deflector to the synchronization mirror.

In the structure above, the light beam never passes through the imaging optics member, when the synchronization mirror reflects and returns, to the emitting position, the light beam for synchronization control emitted from the light source. Thereby, the laser scanning unit can prevent an impact of the imaging optics member, such as misalignment of the light beam path and the like due to optical axis misalignment, and thus improve the detection accuracy of the light beam for synchronization control.

When there are a plurality of imaging optics members in the case above, the synchronization mirror is provided to an imaging optics member most proximate to the light deflector opposite to the light deflector.

A second aspect of the present invention provides a structure where, in the above-described first aspect of the present invention, the synchronization mirror is fixed to the imaging optics member.

The structure can easily improve the relative location accuracy of the synchronization mirror with respect to the imaging optics member. Thereby, the synchronization mirror can be provided proximate to a passing area of the light beam for image formation of the imaging optics member, thus allowing more proper synchronization control.

In the case above, the synchronization mirror may be fixed to the imaging optics member opposite to the light deflector.

A third aspect of the present invention provides a laser scanning unit having a light source that emits a light beam; a light deflector that deflects the light beam from the light source and scans a scanned body, such as photoconductive drum, with the light beam; an imaging optics member, such as f-θ lens, that allows the light beam deflected by the light deflector to form an image on the scanned body; a light detecting sensor that is provided proximate to the light source, detects light intensity of the light source, and detects a light beam for synchronization control; and a light path converting mirror that reflects the light beam from the light source and directs the light beam to the light detector. The light path converting mirror is provided to the imaging optics member opposite to the light deflector, such that the imaging optics member is provided neither on a light beam path from the light source to the light path converting mirror nor on a light beam path from the light path converting mirror to the light deflector.

In the structure above, the light beam never passes through the imaging optics member, when the light deflector reflects and returns, to the emitting position, the light beam for synchronization control emitted from the light source. Thereby, the laser scanning unit can prevent an impact of the imaging optics member, such as misalignment of the light beam path and the like due to optical axis misalignment, and thus improve the detection accuracy of the light beam for synchronization control.

Further, the light beam is reflected by the light deflector merely once, when the light deflector reflects and returns, to the emitting position, the light beam for synchronization control emitted from the light source. Thereby, the laser scanning unit can reduce an impact of the light deflector, such as misalignment of the light beam path due to inclination of a rotating axis, and thus improve the detection accuracy of the light beam for synchronization control.

When there are a plurality of imaging optics members in the case above, the light path converting mirror is provided to an imaging optics member most proximate to the light deflector opposite to the light deflector.

A fourth aspect of the present invention provides a structure where, in the above-described third aspect of the present invention, the light path converting mirror is fixed to the imaging optics member.

The structure can easily improve the relative location accuracy of the light path converting mirror with respect to the imaging optics member.

In the case above, the light path converting mirror may be fixed to the imaging optics member opposite to the light deflector.

A fifth aspect of the present invention provides a structure where, in the above-described third aspect of the present invention, the light source is provided on a side of the light deflector, such that the light beam emitted from the light source crosses a light path from the light deflector to the imaging optics member.

In the structure, even when a divergent light, which is secondarily generated in a process where the light beam emitted from the light source passes through a collecting optics (e.g., a collimator lens) for conversion into a parallel light, deviates from the light path converting mirror and passes outside thereof, a light path of the divergent light is largely away from the scanned body. Thereby, the structure can prevent the scanned body from being improperly exposed to the divergent light.

A sixth aspect of the present invention provides, in the above-described fifth aspect of the present invention, a light deflector assembly, on which the light deflector, a motor that drives the light deflector, and a control circuit component that controls the motor are integrally mounted. A portion on which the control circuit component is mounted is provided to the light deflector assembly on a side thereof opposite to the light source having the light deflector in between.

In the structure, the portion on which the control circuit component is mounted and the light source are provided on the sides opposite to each other having the light deflector in between. The structure thereby allows the light source to be provided not largely protruding in a longitudinal direction from the imaging optics member provided extending lengthways in a scanning direction, and thus allows size reduction of the unit.

The control circuit component herein includes a motor control IC, a capacitor, a connector, and the like.

The embodiments of the present invention are explained in the following, with reference to the above-described drawings.

Figure 1:
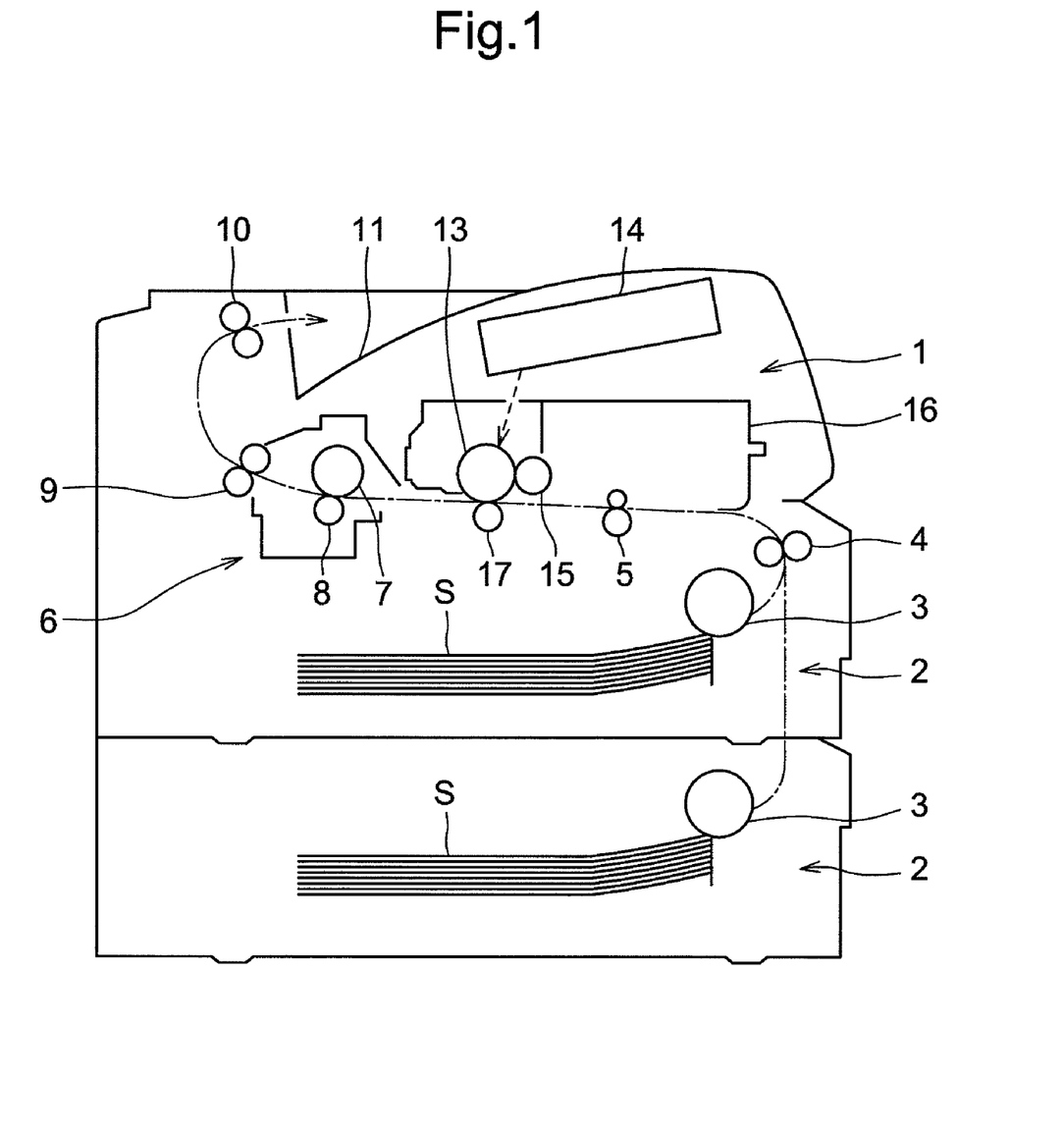
FIG. 1 is a cross-sectional pattern view illustrating an image forming apparatus to which the present invention is applied.

FIG. 1 is a cross-sectional pattern view illustrating an image forming apparatus to which the present invention is applied. The image forming apparatus is provided with image former 1, which forms a predetermined image on recording paper (medium for image formation) S in an electrophotographic method based on image data input from a host apparatus (not shown in the drawing), such as an image scanner or a PC. Recording paper S in paper feeder 2 is supplied, via pick-up roller 3, transport roller 4, and regist roller 5, to image former 1 for an image forming process. Subsequently, recording paper S is transferred to fuser 6 for a fixing process, where a toner image is fixed onto recording paper S as heat and pressure are applied by heating roller 7 and pressure roller 8. Thereafter, recording paper S is ejected onto paper ejection tray 11 through transport roller 9 and paper ejection roller 10.

Image former 1 includes photoconductive drum 13; LSU (Laser Scanning Unit) 14 that irradiates a light beam for exposure on photosensitive drum 13, so as to form an electrostatic latent image; developer 16 that supplies a toner onto photoconductive drum 13 using development roller 15, so as to form a toner image corresponding to the electrostatic latent image; and transfer roller 17 that transfers onto recording paper S, the toner image formed on photoconductive drum 13. In addition to the above-listed components, image former 1 is provided with a charger that evenly charges photoconductive drum 13; a cleaner that cleans photoconductive drum 13; and the like.

Figure 2:
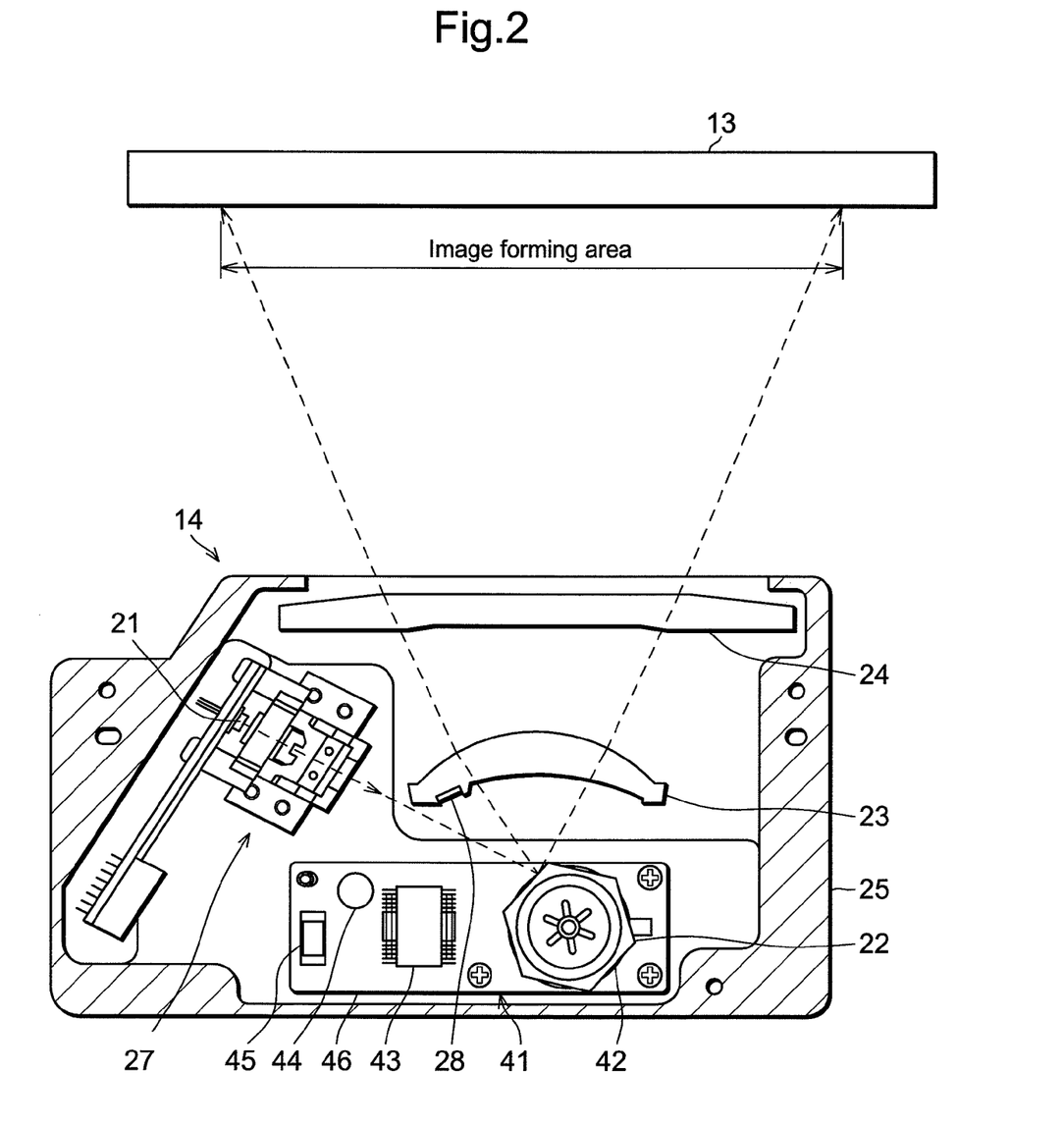
FIG. 2 is a cross-sectional view of a laser scanning unit (LSU) shown in FIG. 1.

FIG. 2 is a cross-sectional view of LSU 14 shown in FIG. 1. LSU 14 has light source 21 provided with a laser element therein that generates a light beam; light deflector 22 comprising a rotating polygon mirror that deflects the light beam emitted from light source 21 and scans photoconductive drum 13 with the light beam; f-θ lenses 23 and 24 that allow the light beam deflected by light deflector 22 to form an image on photoconductive drum 13; and housing 25 that houses the above-listed components.

Light source 21 configures laser block 27, which is provided, in addition to light source 21, with a collimator lens that converts the light beam emitted from light source 21 into a parallel light; a cylindrical lens that collects the light beam in a sub-scanning direction; an aperture that adjusts the light beam to a predetermined diameter and that limits input of external light; and other optical components.

Light deflector 22 configures light deflector assembly 41. Motor 42 that drives light deflector 22; control circuit components that control motor 42, such as motor control IC 43, capacitor 44, and connector 45; and the like, are mounted on board 46 of light deflector assembly 41, in addition to light deflector 22.

Figure 3:
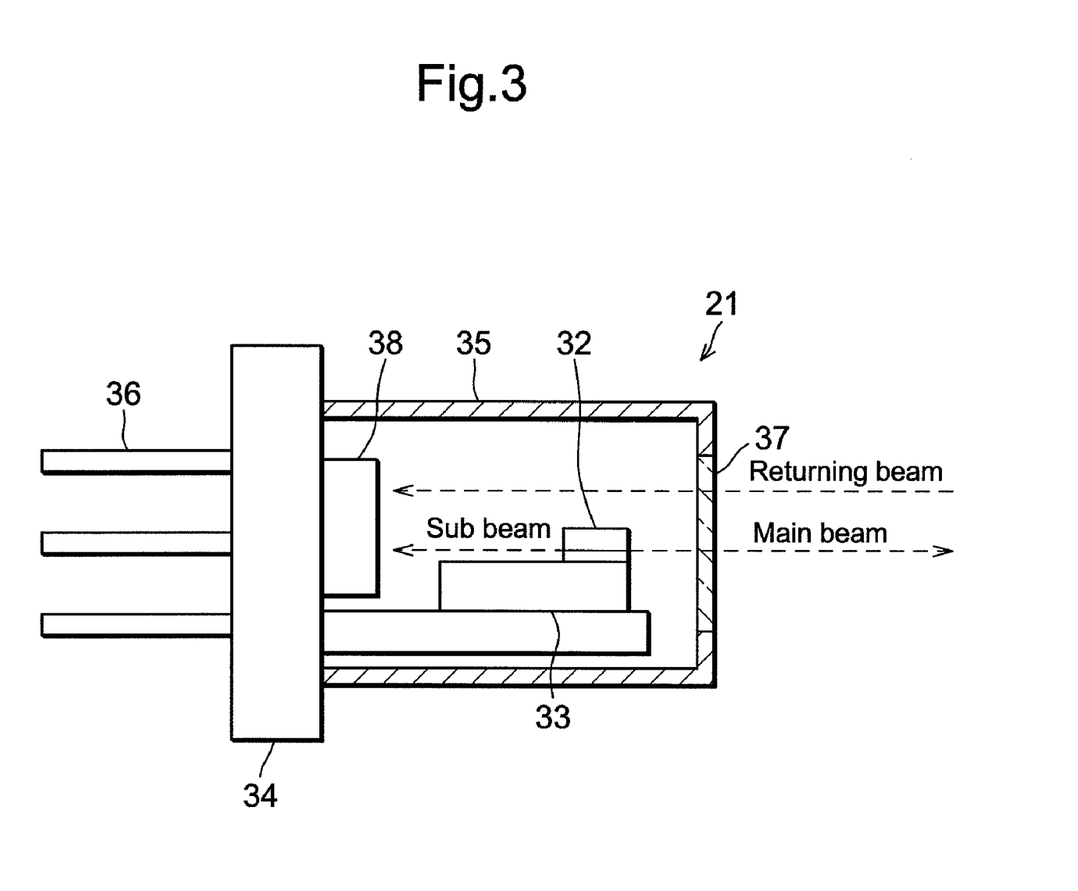
FIG. 3 is a cross-sectional view of a light source shown in FIG. 2.

FIG. 3 is a cross-sectional view of light source 21 shown in FIG. 2. Light source 21, which is a commonly-called can type, includes laser element 32 that generates a light beam; heat sink 33 on which laser element 32 is mounted; stem 34 that supports heat sink 33; cap 35 that surrounds laser element 32 and heat sink 33; and lead pin 36 that extends from stem 34. Cap 35 is provided with optical glass window 37, through which a main beam generated on a front side of laser element 32 is emitted to outside.

Light source 21 is further provided with light receiving element such as an light detecting sensor, 38 on stem 34. A sub beam for light intensity detection generated from a rear side of laser element 32 enters light receiving element 38, whereby the light intensity of light element 32 is detected. Further, a returning beam enters light receiving element 38 as described hereinafter in detail. The returning beam is the main beam generated from the front side of laser element 32 and reflected by a predetermined reflector.

A monitor signal output from light receiving element 38 is input to a controller (not shown in the drawing). Based on the monitor signal from light receiving element 38, the controller detects the light intensity of the sub beam of laser element 32. The controller then compares the detected light intensity with a predetermined reference value, and obtains light intensity compensation data. Based on the light intensity compensation data, the controller increases or decreases the light intensity of laser element 32, so as to maintain at a constant level the light intensity of laser element 32 subject to fluctuation depending on environmental change, such as a temperature change and the like.

Further, LSU 14 is provided with synchronization mirror 28 as shown in FIG. 2. In order to control a scan timing of the light beam onto photoconductive drum 13 by light deflector 22, synchronization mirror 28 reflects and returns, to an emitting position, the light beam for synchronization control emitted from light source 21, and then light receiving element 38 provided inside light source 21 detects the light beam and outputs a monitor signal. The controller (not shown in the drawing) detects a timing of the light beam for synchronization control and outputs a timing signal according to the monitor signal output from light receiving element 38. In response to the timing signal, the controller drives laser element 32 to start writing a line.

Figure 4:
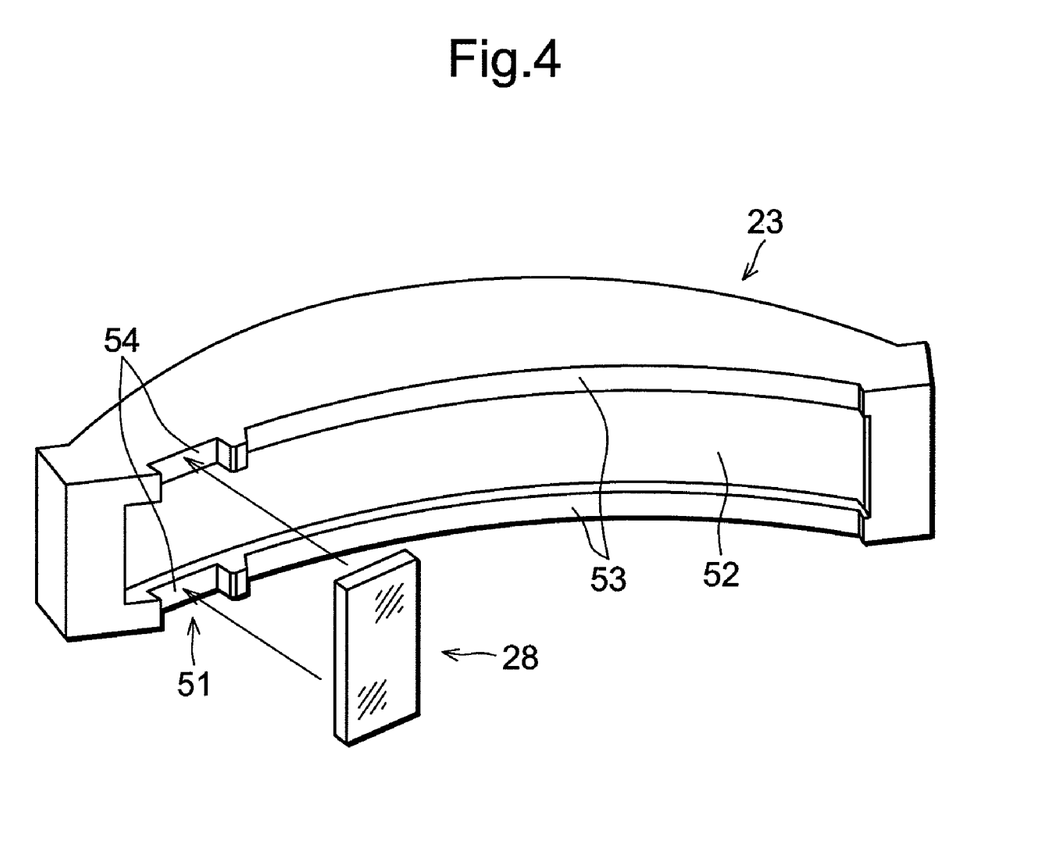
FIG. 4 is a perspective exploded view of an f-θ lens and a synchronization mirror shown in FIG. 2.

FIG. 4 is a perspective exploded view of f-θ lens 23 and synchronization mirror 28 shown in FIG. 2. Synchronization mirror 28 is fixed to f-θ lens 23. Mirror attachment 51, which fixes synchronization mirror 28, is provided at an end portion of f-θ lens 23, so as not to interfere with a passing area of the light beam for image formation. In the structure herein in particular, rib 53 provided on both sides of lens portion 52 of f-θ lens 23 is provided with cutout 54, into which synchronization mirror 28 fits so as to be accurately fixed to a predetermined position.

Figure 5A:
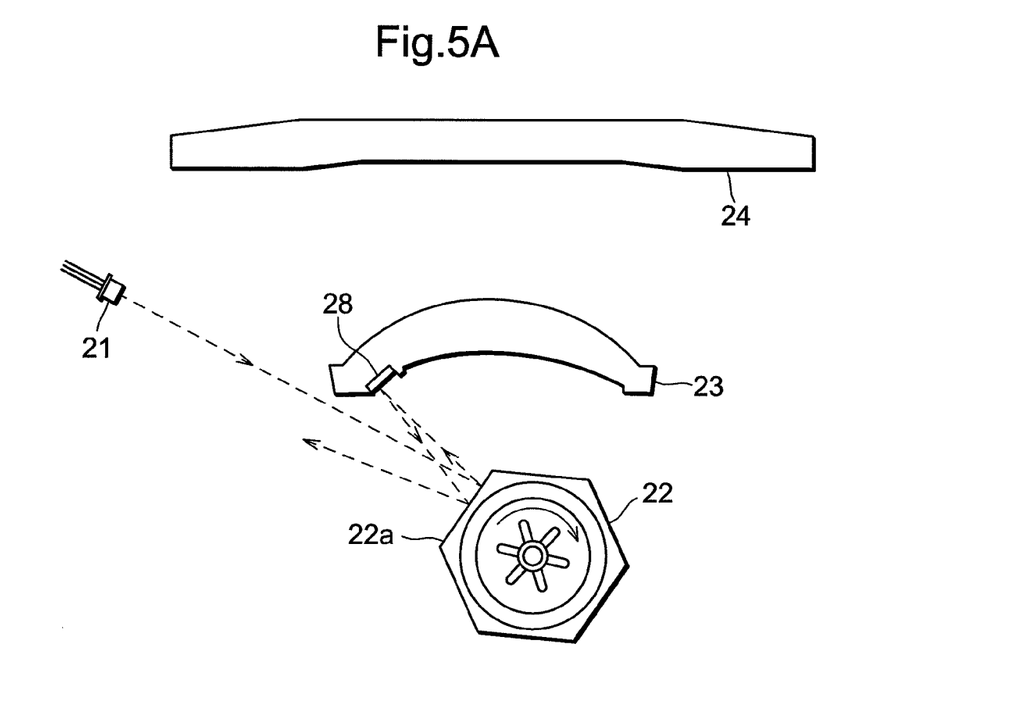
FIGS. 5A and 5B are top views illustrating reflection of a light beam for synchronization control in the LSU shown in FIG. 2.
Figure 5B:
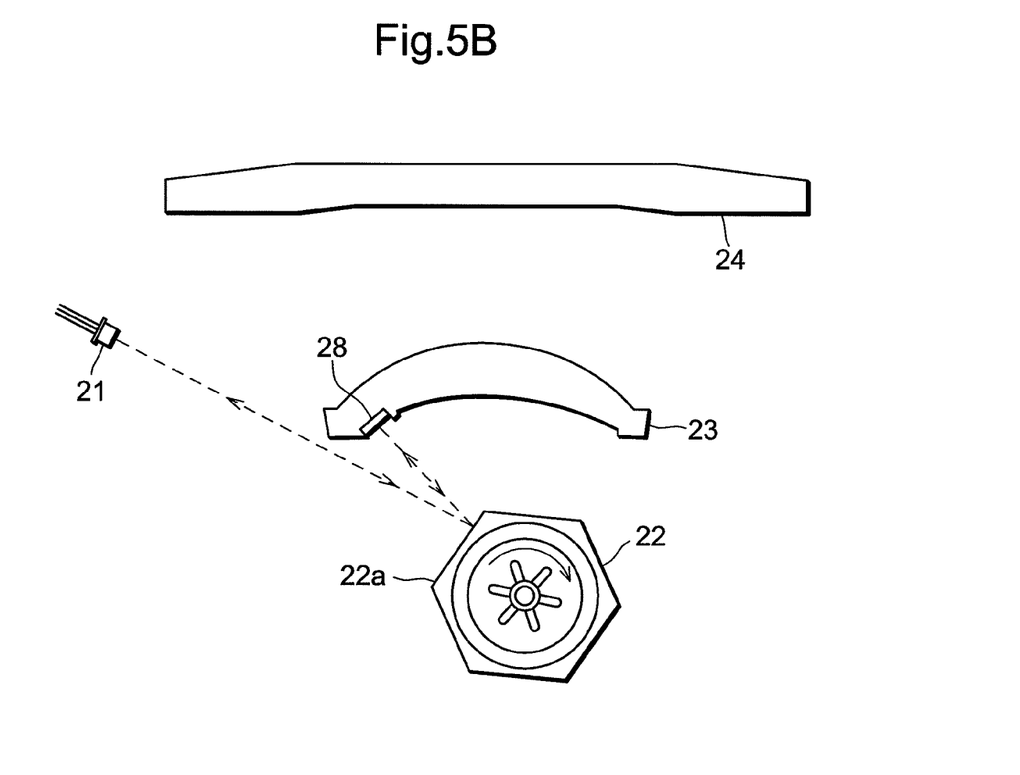

FIGS. 5A and 5B are top views illustrating reflection of the light beam for synchronization control in LSU 14 shown in FIG. 2. Detection of the light beam starts in a state shown in FIG. 5A. In a state shown in FIG. 5B, the light beam emitted from light source 21 is deflected by light deflector 22, and then enters synchronization mirror 28. The light beam reflected thereby returns to light source 21 via light deflector 22. The returning beam enters light receiving element 38 in light source 21, whereby the timing of the light beam is detected.

Synchronization mirror 28 herein is provided on a light deflector 22 side of f-θ lens 23, which is closer to light deflector 22. Thus, when the light beam emitted from light source 21 is reflected by synchronization mirror 28 and returned to light source 21, the light beam does not pass through f-θ lenses 23 and 24 both on an outgoing path from light source 21 to synchronization mirror 28 and on a returning path from synchronization mirror 28 to light source 21. Thereby, an impact of f-θ lenses 23 and 24, that is, misalignment of a light beam path due to optical axis misalignment of f-θ lenses 23 and 24, is prevented, and thus the detection accuracy of the light beam for synchronization control can be improved.

The light beam for synchronization control is detected immediately before image formation. The light beam for synchronization control emitted from light source 21 is reflected on a front end portion in a rotating direction of reflection surface 22a of light deflector 22, that is, on a front area in the rotating direction of an area provided in a central portion of reflection surface 22a for reflecting the image formation beam.

Figure 6A:
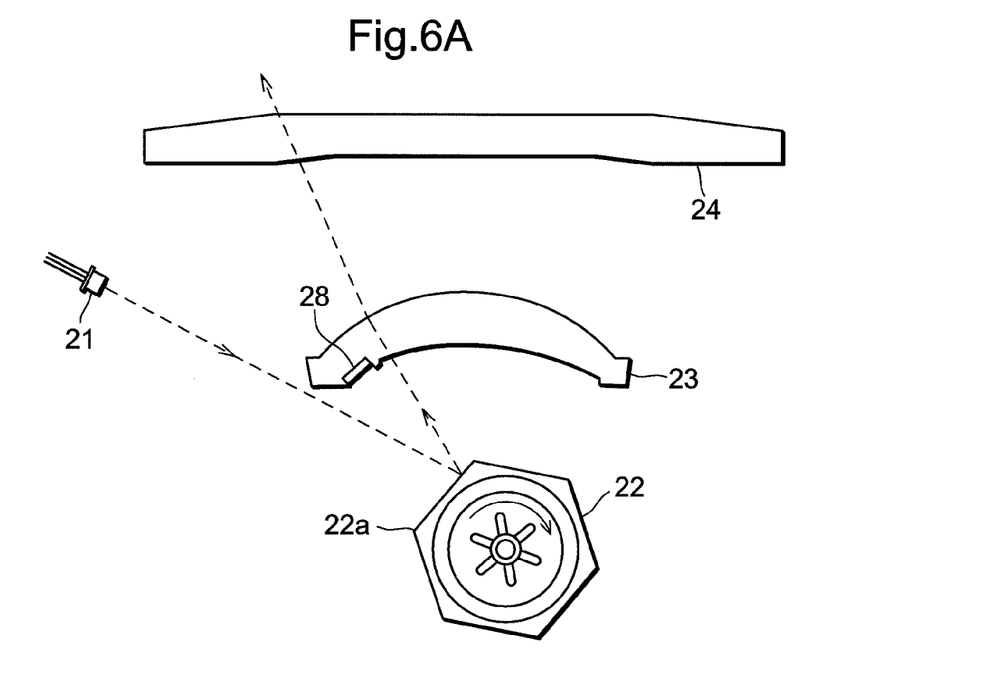
FIGS. 6A and 6B are top views illustrating reflection of a light beam for image formation in the LSU shown in FIG. 2.
Figure 6B:
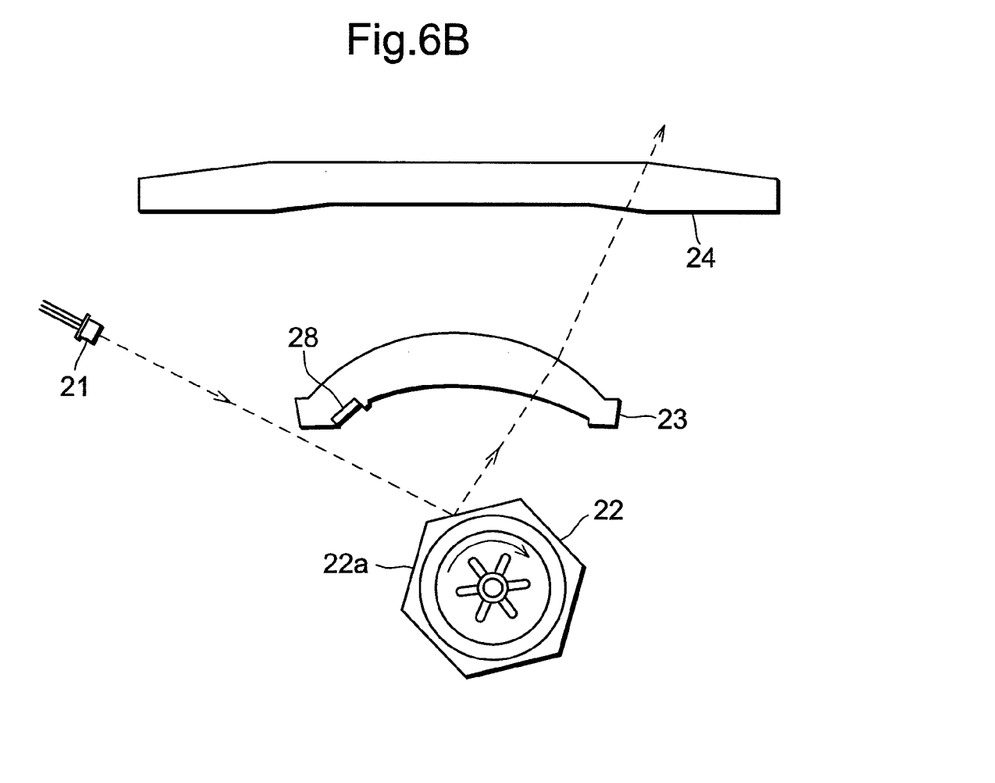

FIGS. 6A and 6B are top views illustrating reflection of the light beam for image formation in LSU 14 shown in FIG. 2. Based on the scan timing obtained when the light beam for synchronization control is detected, photoconductive drum 13 is scanned. Writing starts in a state shown in FIG. 6A and continues through a state shown in FIG. 6B. In the process, the light beam emitted from light source 21 is deflected by light deflector 22; passes through f-θ lenses 23 and 24 in sequence; and reaches photoconductive drum 13, on which the light beam for image formation is provided to form an image.

Synchronization mirror 28 herein is accurately fixed to f-θ lens 23, and thus can be provided proximate to the passing area of the light beam for image formation of f-θ lens 23. The structure thereby reduces a time difference between the detection of the light beam for synchronization control shown in FIG. 5B and the writing start shown in FIG. 6A, thus further allowing proper synchronization control.

Following the above-described image formation, light receiving element 38 detects the sub beam for light intensity detection, which is generated from the rear side of laser element 32 of light source 21 as shown in FIG. 3. During the light intensity detection, the light beam (main beam) emitted from the front side of laser element 32 is reflected on a rear end potion in the rotating direction of reflection surface 22a of light deflector 22, that is, on a rear area in the rotating direction of the area for reflecting the image formation beam. The reflected beam travels in a direction largely different from light source 21. Thus, even when the light beam turns into a stray light, the stray light does not enter light receiving element 38 of light source 21 at a high intensity, thereby preventing an adverse impact of the stray light.

Figure 7:
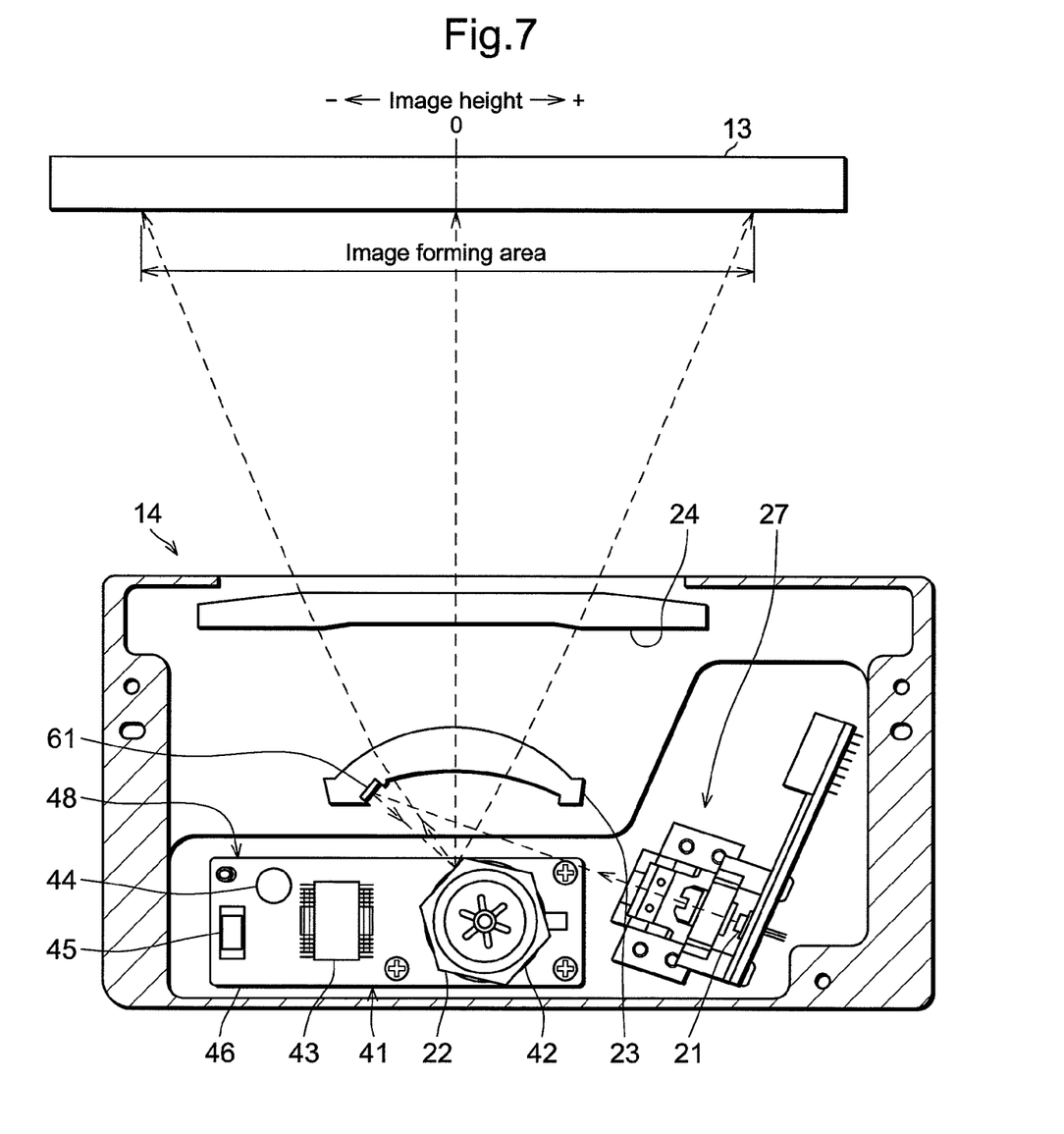
FIG. 7 is a cross-sectional view illustrating another example of the LSU shown in FIG. 1.

FIG. 7 is a cross-sectional view illustrating another example of LSU 14 shown in FIG. 1. LSU 14 herein directs the light beam emitted from light source 21 to light deflector 22 via light path converting mirror 61. In LSU 14 herein in particular, the light beam is emitted toward light path converting mirror 61 provided on a first end side of f-θ lens 23 in a scanning direction, from light source 21 provided on a second end side of f-θ lens 23 in the scanning direction. The light beam traveling from light source 21 to light path converting mirror 61 thus crosses a light path from light deflector 22 to f-θ lens 23.

Similar to the synchronization mirror shown in the example of FIG. 4, light path converting mirror 61 is fixed to f-θ lens 23, and thereby improves the relative location accuracy of light path converting mirror 61 with respect to f-θ lens 23.

The rotating axis of light deflector 22 is provided proximate to the center line of the scanning direction of f-θ lenses 23 and 24, that is, the center line along a light path of image height 0 on photoconductive drum 13. Further, mount potion 48 of light deflector assembly 41 for the control circuit components, which include motor control IC 43, capacitor 44, and connector 45, is provided on a side opposite to light source 21 having light deflector 22 in between. The structure thereby allows light source 21 and light deflector assembly 41 to be provided not largely protruding in a longitudinal direction from f-θ lenses 23 and 24, which are provided extending lengthways in the scanning direction, and thus allows size reduction of LSU 14.

Figure 8A:
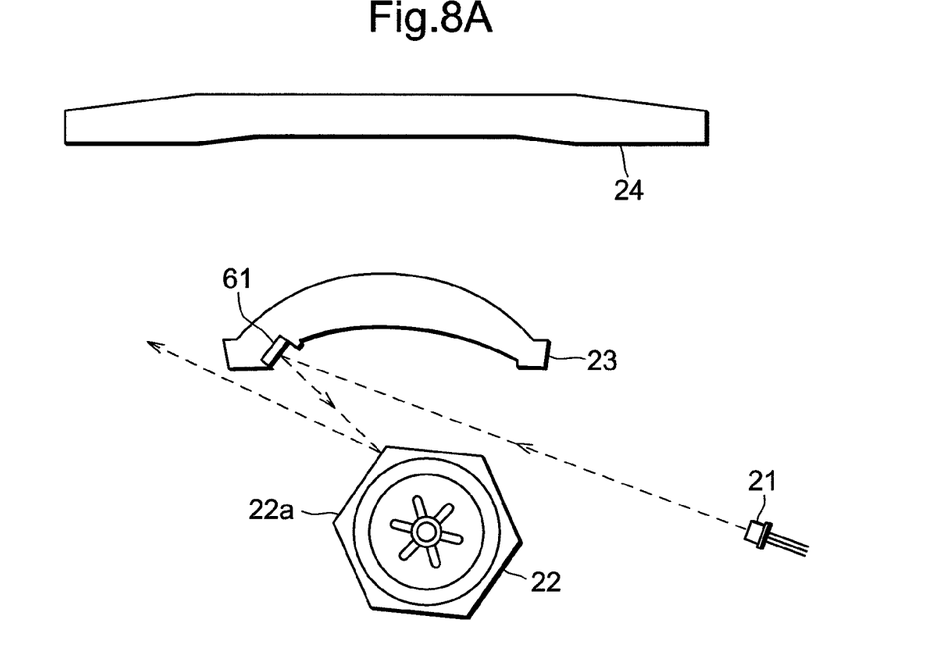
FIGS. 8A and 8B are top views illustrating reflection of a light beam for synchronization control in the LSU shown in FIG. 7.
Figure 8B:
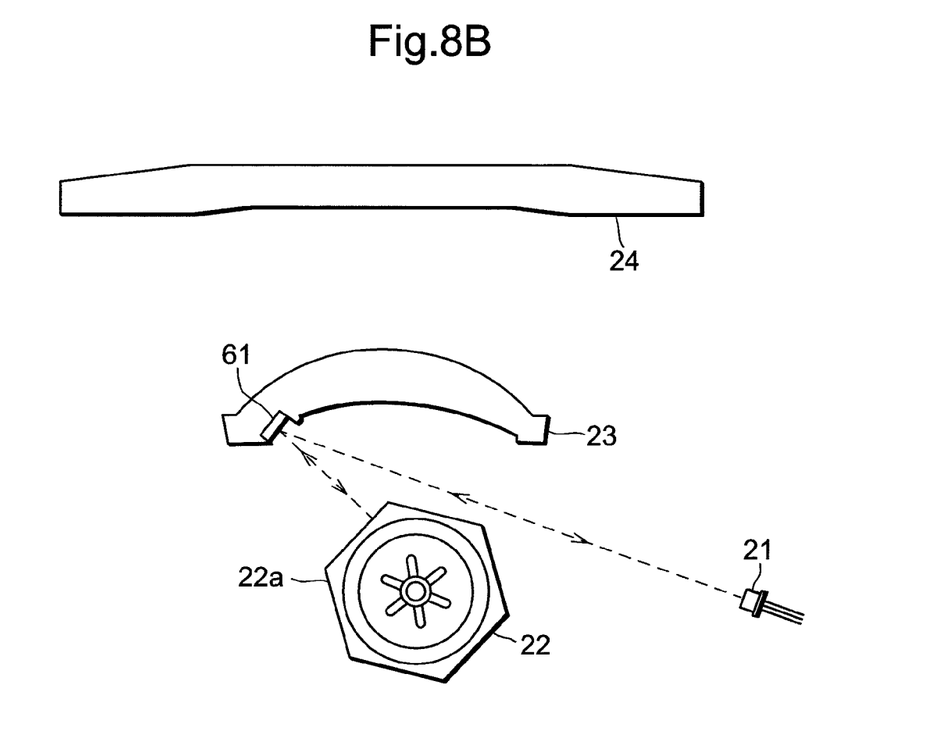

FIGS. 8A and 8B are top views illustrating reflection of the light beam for synchronization control in LSU 14 shown in FIG. 7. Detection of the light beam starts in a state shown in FIG. 8A. In a state shown in FIG. 8B, the light beam emitted from light source 21 enters light deflector 22 via light path converting mirror 61. The light beam reflected thereby returns to light source 21 via light path converting mirror 61. The returning beam enters light receiving element 38 in light source 21, whereby the timing of the light beam is detected.

Light path converting mirror 61 herein is provided on a light deflector 22 side of f-θ lens 23, which is closer to light deflector 22. Thus, when the light beam emitted from light source 21 is reflected by light deflector 22 and returned to light source 21, the light beam does not pass through f-θ lenses 23 and 24 both on an outgoing path from light source 21 to light deflector 22 and on a returning path from light deflector 22 to light source 21. Thereby, an impact of f-θ lenses 23 and 24, that is, misalignment of a light beam path due to optical axis misalignment of f-θ lenses 23 and 24, is prevented, and thus the detection accuracy of the light beam for synchronization control can be improved.

Further, when the light beam for synchronization control emitted from light source 21 is returned by light deflector 22 to light source 21, the light beam is reflected by light deflector 22 merely once. Thus, an impact of light deflector 22, that is, misalignment of a light beam path due to axis inclination of light deflector 22, is minimized, and thereby the detection accuracy of the light beam for synchronization control can be improved.

Figure 9A:
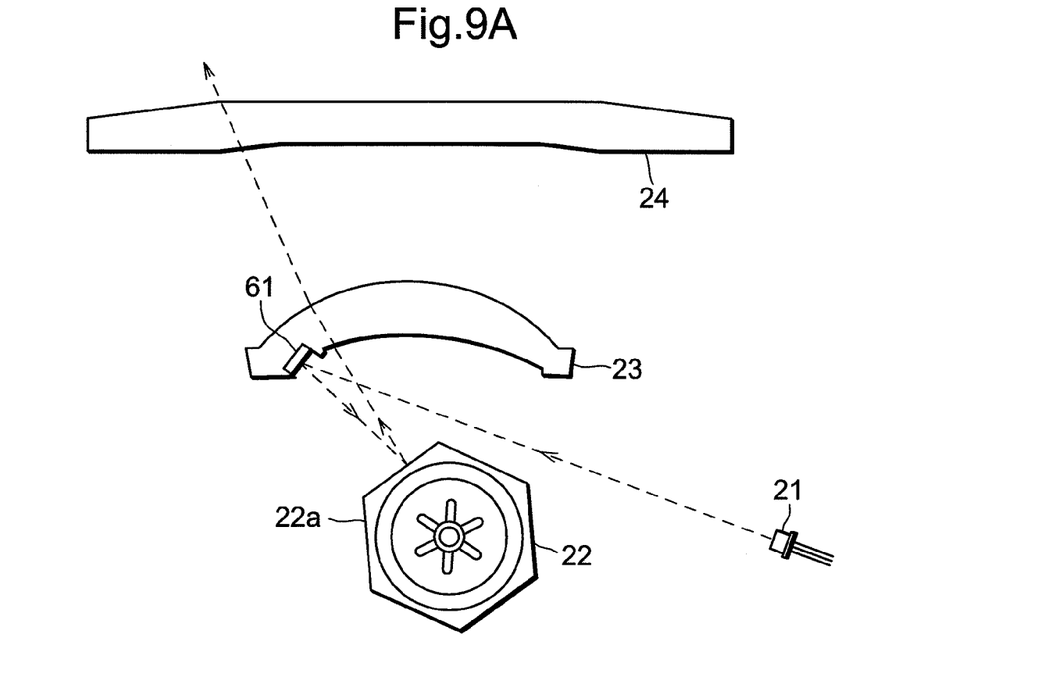
FIGS. 9A and 9B are top views illustrating reflection of a light beam for image formation in the LSU shown in FIG. 7.
Figure 9B:
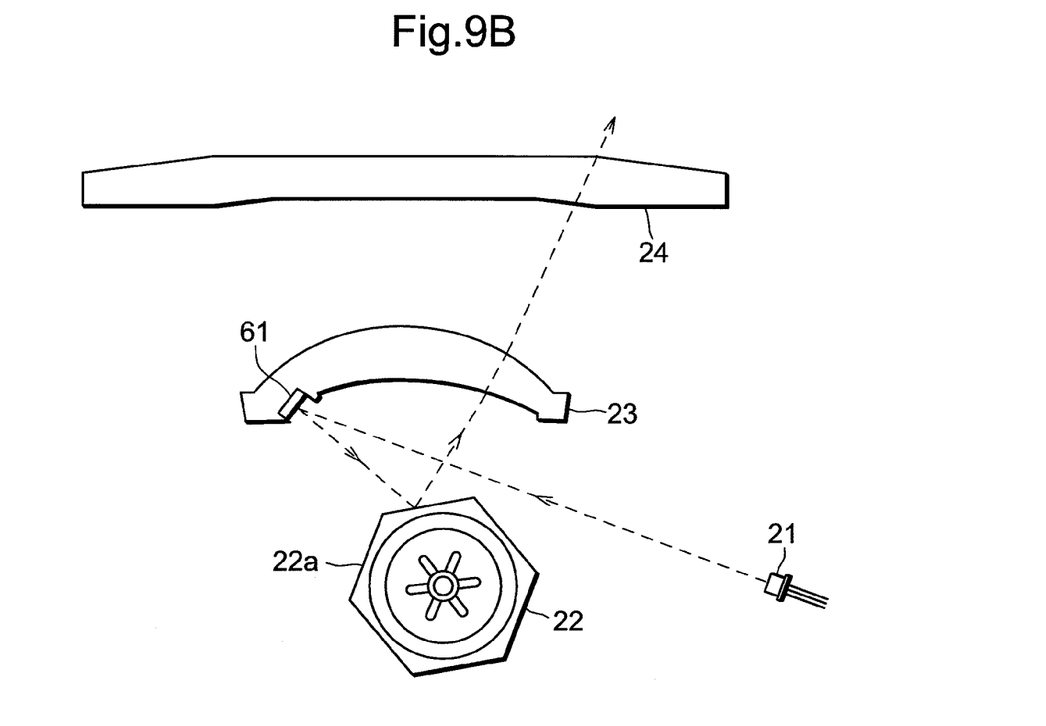

FIGS. 9A and 9B are top views illustrating reflection of the light beam for image formation in LSU 14 shown in FIG. 7. Based on the scan timing obtained when the light beam for synchronization control is detected, photoconductive drum 13 is scanned. Writing starts in a state shown in FIG. 9A and continues through a state shown in FIG. 9B. In the process, the light beam emitted from light source 21 is deflected by light deflector 22; passes through f-θ lenses 23 and 24 in sequence; and reaches photoconductive drum 13, on which the light beam for image formation is provided to form an image.

Similar to the above-described example, the light beam for synchronization control shown in FIGS. 8A and 8B is detected immediately before the image formation shown in FIGS. 9A and 9B. The light beam is reflected on a front area in a rotating direction of an area for reflecting the image formation beam provided on reflection surface 22a of light deflector 22. The light intensity is detected after the image formation. During the light intensity detection, the light beam is reflected on a rear area in the rotating direction of the area for reflecting the image formation beam provided on reflection surface 22a of light deflector 22.

Figure 10:
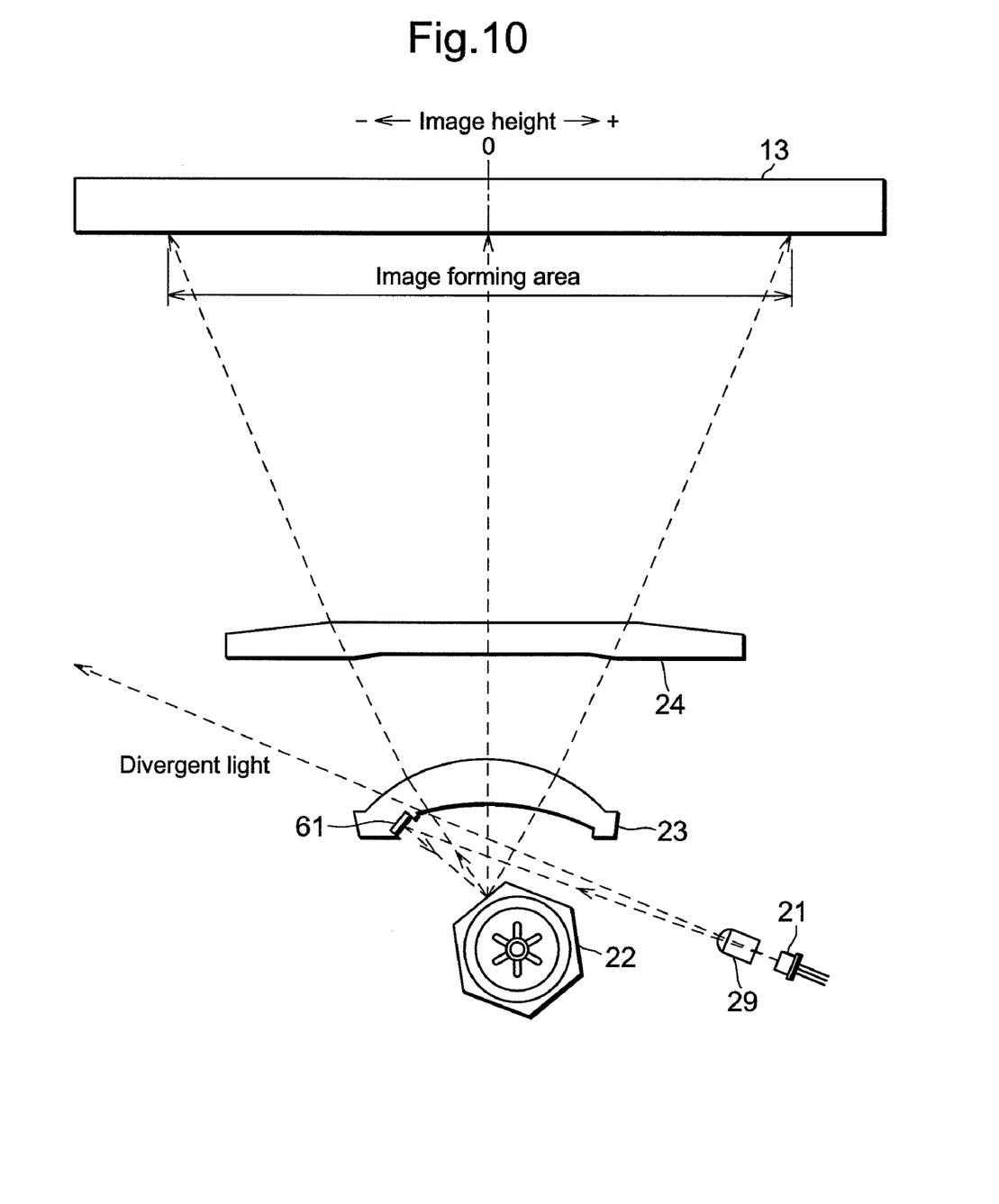
FIG. 10 is a top view illustrating a divergent light in the LSU shown in FIG. 7.

FIG. 10 is a top view illustrating a divergent light in LSU 14 shown in FIG. 7. The divergent light is secondarily generated in a process where the light beam emitted from light source 21 passes through anamorphic collimator lens 29, which configures a collecting optics, so as to be converted into a parallel light.

A portion of the divergent light deviates from light path converting mirror 61 and passes outside thereof. Light source 21 herein is provided on the side of light deflector 22, such that the light beam emitted from light source 21 crosses the light path from light deflector 22 to the f-θ lens. Thus, the light path of the divergent light is largely away from photoconductive drum 13, thereby preventing photoconductive drum 13 from being improperly exposed to the divergent light.

The laser scanning unit and the image forming apparatus having the same according to the embodiment of the present invention are capable of preventing an impact from the imaging optics member to the light beam for synchronization control, and thereby improving the detection accuracy of the light beam for synchronization control. Further, the laser scanning unit and the image forming apparatus having the same are effective in reducing an impact from the light deflector to the light beam for synchronization control, and thereby improving the detection accuracy of the light beam for synchronization control. Since one light detecting sensor is used for detecting both the light intensity of the light source and the light beam for synchronization control, the present invention is useful when applied to a laser scanning unit and an image forming apparatus having the same, in which a predetermined mirror reflects and returns, to an emitting position, a light beam for synchronization control emitted from a light source, and then a light detecting sensor provided proximate to the light source performs detection. Such an image forming apparatus includes a printer, a digital copier, a facsimile apparatus, and the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2006-238770 filed on Sep. 4, 2006, entire content of which is expressly incorporated by reference herein.

What is claimed is:

1. A laser scanning unit comprising:
a light source that emits a light;
a light deflector that deflects the light from said light source and scans a scanned body with the light;
an imaging optics member that allows the light deflected by said light deflector to form an image on said scanned body;
a light detecting sensor that detects light intensity of said light source, and detects the light for synchronization control; and
a synchronization mirror that reflects the light from said light source for synchronization control and directs the light to said light detecting sensor; wherein
said synchronization mirror is fixed to said imaging optics member opposite to said light deflector, said imaging optics member being provided outside of a light path of light from said light source to said light deflector and outside of the light path of light from said light deflector to said synchronization mirror.

2. An image forming apparatus having the laser scanning unit according to claim 1.

3. The laser scanning unit according to claim 1, wherein said synchronization mirror is provided on a light deflector side of said imaging optics member.

4. The laser scanning unit according to claim 3, wherein said imaging optics member includes a cutout configured to fix said synchronization mirror to said imaging optics member.

5. A laser scanning unit comprising:
a light source that emits a light;
a light deflector that deflects the light from said light source and scans a scanned body with the light;
an imaging optics member that allows the light deflected by said light deflector to form an image on said scanned body;
a light detecting sensor that detects light intensity of said light source, and detects the light for synchronization control; and
a light path converting mirror that reflects the light from said light source and directs the light to said light deflector; wherein
said light path converting mirror is fixed to said imaging optics member opposite to said light deflector, said imaging optics member being provided outside of a first light path of light from said light source to said light path converting mirror and outside of a second light path of light from said light path converting mirror to said light deflector.

6. The laser scanning unit according to claim 5, wherein the first light path crosses a third light path from said light deflector to said scanned body.

7. The laser scanning unit according to claim 6, further comprising:
a light deflector assembly, on which said light deflector, a motor that drives said light deflector, and a control circuit component that controls said motor are integrally mounted, wherein
said light detector is provided between said control circuit component and said light source on said light deflector assembly.

8. The laser scanning unit according to claim 5, wherein said light path converting mirror is provided on a light deflector side of said imaging optics member.

9. The laser scanning unit according to claim 8, wherein said imaging optics member includes a cutout configured to fix said light path converting mirror to said imaging optics member.

10. A laser scanning unit comprising:
a light source that emits a light;
a light deflector that deflects the light from the light source and scans a scanned body with the light;
an imaging optics member that allows the light deflected by said light deflector to form an image on said scanned body;
a light detecting sensor that detects a light intensity of said light source and detects the light for synchronization control; and
a mirror configured to reflect light emitted by said light source for synchronization control and to direct the light to said light detecting sensor; wherein
said mirror is fixed to said imaging optics member opposite said light deflector along a path of light from said light source such that the light for synchronization control is received by said light detecting sensor without being incident upon a refracting surface of said imaging optics member.

11. The laser scanning unit according to claim 10, wherein light emitted from said light source is deflected by said light deflector towards said mirror, is reflected by said mirror towards said light deflector and is deflected by said light deflector towards said light detecting member.

12. The laser scanning unit according to claim 10, wherein light emitted from said light source is reflected by said mirror onto said light deflector and is deflected by said light deflector onto said mirror to be reflected towards said light detecting sensor.

13. The laser scanning unit according to claim 10, wherein the light is deflected twice by said light deflector and once by said mirror to form the image on the scanned body.

14. The laser scanning unit according to claim 10, wherein the light is reflected twice by said mirror and once by said light deflector to detect the light for synchronization control.

15. The laser scanning unit according to claim 10, wherein said mirror is provided on a light deflector side of said imaging optics member.

16. The laser scanning unit according to claim 15, wherein said imaging optics member includes a cutout configured to fix said mirror to said imaging optics member.

\* \* \* \* \*